Aug. 5, 1947.    H. G. BUSIGNIES    2,424,967
DIRECTION FINDER SYSTEM
Filed April 6, 1942    2 Sheets-Sheet 2

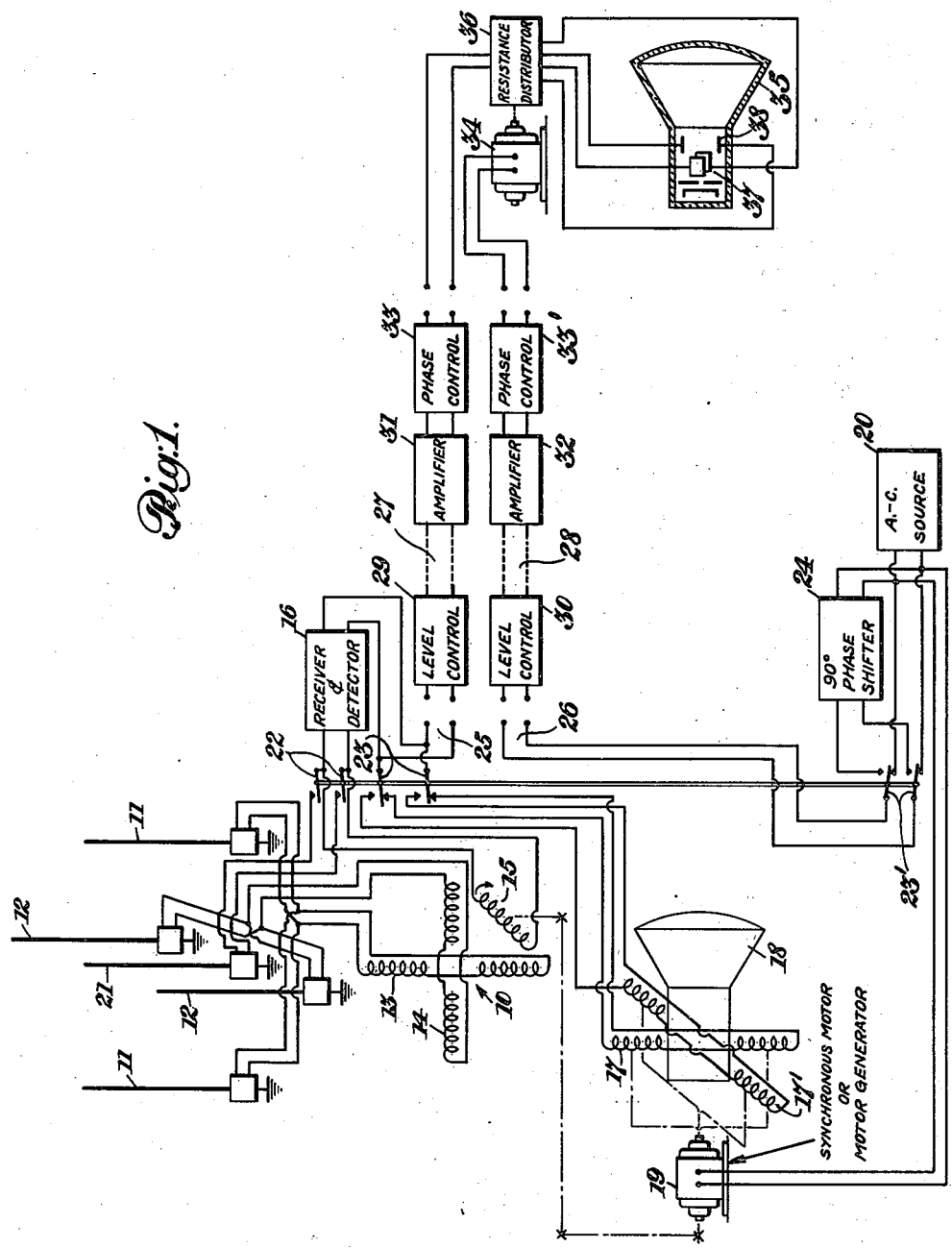

INVENTOR.
HENRI G. BUSIGNIES
BY Paul R. Adams
ATTORNEY

Patented Aug. 5, 1947

2,424,967

UNITED STATES PATENT OFFICE 2,424,967

DIRECTION FINDER SYSTEM

Henri G. Busignies, Forest Hills, N. Y., assignor to Federal Telephone and Radio Corporation, a corporation of Delaware Application April 6, 1942, Serial No. 437,844

6 Claims. (Cl. 250—11)

This invention relates to direction finder systems and in particular to such systems wherein direction finding indications are to be viewed remote from the antenna and receiving apparatus.

It is a primary object of the invention to provide improved means for transmitting direction finding signals to a distant viewing station.

Another object is to provide improved means for transmitting a plurality of signals over a single line.

A further object is to provide improved means for synchronizing remotely separated similar pieces of apparatus.

A more specific object is to provide an improved direction-finding system wherein the antenna and receiver apparatus may be located at a point remote from one or a plurality of indicating systems responsive thereto.

Other objects and further features of novelty and invention will hereinafter be pointed out or will become apparent to those skilled in the art from a reading of the following specification in conjunction with the drawings included herewith.

In said drawings—

Fig. 1 is a schematic block diagram of a direction-finding and indicating system according to the invention; and Figs. 2, 3 and 4 are various alternative embodiments of portions of the apparatus of Fig. 1.

A direction-finding system generally comprises antenna means and means for effectively rotating the general directivity of this antenna means. A receiver connected to the output of such an antenna will detect large amplitude signals when its directivity is aimed at a transmitting station to the frequency of which the receiver is responsive. A usual form of indicating apparatus employed in such a direction-finding system is the cathode ray tube. Such an indicator may be operated by means setting up an effectively rotating deflection field within the tube and by varying the magnitude of this deflection in accordance with received signals. In the most accurate known type of system (hereafter referred to as the rotary coil type), such effectively rotating deflection field within the cathode ray tube is established by mechanically rotating a system of coils around the neck of the tube. To separate such an indicating system, it is therefore necessary to have a source of mechanical rotation as well as a control signal indicative of the detected signal. In another known form of system (hereafter referred to as the static plate type), rotating deflection field is produced by applying suitably varying potentials in phase quadrature to two pairs of deflection plates fixed within the tube. It is thus necessary in operating the static plate type of indicating system to have two control signals, one indicative of the effective rotation of the antenna and the other indicative of the values of the detected signal for each given angle of such effective rotation.

In accordance with the invention, the receiving apparatus is located so remote from the indicating apparatus that mechanical transmission of rotation from the goniometer to the indicator is impossible in the case of the rotary coil type of system and so remote that in the case of the static plate systems the two above-mentioned signals may not be transmitted faithfully to the indicating apparatus and accordingly considerable lack of co-ordination between the two signals is noticeable, in addition to the fact that there is an inevitable lack of synchronization between effective rotation of the field within the indicating apparatus and effective rotation of the antenna directivity.

Referring to Fig. 1, a preferred embodiment of direction-finding and indicating equipment utilizes a fixed antenna structure of the Adcock type coupled to a goniometer arrangement 10. The Adcock antenna comprises two pairs of antenna elements 11, 11 and 12, 12, the axes of said pairs being mutually perpendicular. Energy detected by the pair 11, 11 is supplied to one set of coils 13 of goniometer 10, and energy picked up by the other pair 12, 12 is fed to another set of goniometer coils 14 which latter are disposed in quadrature relation with the coils 13. The directional sensitivity of the above-described Adcock antenna is effectively rotated by rotation of a search coil 15 associated with goniometer 10, and output of this coil is normally supplied directly to a receiver 16 including a detector for deriving the envelope of detected signals. The detector-receiver 16 is preferably of the full-wave rectifying type, whereby the signal output therefrom is characterized by a series of finely defined cusps identifying those portions of the detected envelope of received signals which pass through the alternating current axis thereof and which thus correspond to zero detected signal.

In a preferred form of indicating device, output signals from detector 16 are supplied directly to a deflection coil system 17 of a local cathode ray indicating tube 18 provided at the same location as the receiving equipment. Coil system 17 is mounted so that it may be rotated symmetrically about the normal axis of the cathode ray produced in tube 18. This rotation is in synchronism with rotation of search coil 15 and, hence, with effective rotation of the directivity of the antenna system. In the form shown, both search coil 15 and deflection system 17 are rotated by a synchronous motor 19 fed from a source 20 of alternating current of the desired rotation frequency.

It is clear that for every rotation of search coil 15, two maxima of detected signal are obtained, one for true directivity and the other representing a 180° error. In accordance with known methods, this so-called 180° ambiguity may be eliminated by properly combining with the signals picked up by coil 15, a signal picked up by a non-directional antenna system. To render the reading more convenient, a substantial shift in phase, say 90°, is effected in the rotation of the deflecting field for indicator tube 18. In the form shown, this "sensing" signal is obtained from a non-directional antenna element 21 shown centrally located with respect to the Adcock antenna elements and relayed to receiver detector 16 when a switch 22 is in the closed position. A 90° shift in phase of the synchronous rotation of motor 19 is obtained by throwing a switch 23 also into a raised position so as to connect receiver output to a deflection system 17' in 90° spaced relation with respect to system 17. Operation of a further switch 23' serves to connect an appropriate phase shifter 24 in circuit with the supply line 26 for the remote indicating apparatus. Switches 22 and 23 are interconnected so that a single manual operation, as for example, a push button control, will serve simultaneously to connect receiver 16 to the non-directional "sensing" signals and also effectively to advance the rotation of phase of motor 19 approximately 90°.

In accordance with the invention, a duplicate of the indications obtained on the screen of the cathode ray tube 18 is obtained at a remote indicating station by transmitting output from receiver-detector 16 along one transmission channel and a synchronizing signal as normally obtained from the lines supplying motor 19 on another transmission channel. Outputs for these connections to transmission lines are identified, for the apparatus thus far described, by reference characters 25, 26. Thus, output from detector 16 is connected to a transmission line 27 and synchronizing signals are transmitted to a transmission line 28. Both transmission lines 27 and 28 include at the antenna end thereof appropriate means 29, 30 for adjusting the level of the respective signals transmitted therethrough for most appropriate transmission.

At the remote end, these lines include amplifier means 31, 32 and phase control means 33, 33'. These latter devices are locally energized and once adjusted will not need much further supervision. Amplifier 32 in the synchronizing-signal transmission line 28 supplies sufficient boost to the voltage level at the remote end thereof that the output voltage may operate another synchronous motor 34. As in the case of motor 19, motor 34 serves to set up a field within the remote indicating tube 35 rotating in synchronism with that in tube 18 and, accordingly, in synchronism with effective rotation of the directivity of the Adcock antenna. When "sensing" signals are being relayed, as has been explained, a 90° phase shift of synchronizing signals is applied to terminals 26 of line 28. When such synchronizing signals are applied to motor 34, the latter will automatically follow the shift without there being any need for a 90° shift in applied deflection potentials, as will be clear. In a preferred form motors 19 and 34 rotate at speeds in the neighborhood of 20 to 30 R. P. M. It has been found that within ten turns, or about a third of a second, motor 34 has attained its "sensing" phase relationship. Since the push button control in the "sensing" signals is usually operated for at least one or two seconds, it is clear that motor 34 will assume its advanced phase rotation within a short fraction of this viewing time so that good readings will not be impaired by inertia of the motor 34. The phase control means 33' is provided to adjust the phase of the synchronizing signals in appropriate relation with that of signals applied to the input of transmission line 28. The amplifier 31 and phase control means 33 provided in transmission line 27 serve a function analogous to that described in connection with line 28 and supply detected signals of appropriate magnitude and phase relation to produce on the screen of indicator tube 35 a directional indication which is an exact duplicate of that appearing on the screen of tube 18, as will be clear.

The remote indicating apparatus including tube 35 will be observed as different from that described at the antenna end of the transmission lines in order to illustrate that principles of the invention are applicable to a number of indicating systems. This remote indicating apparatus comprises a resistance-distributor arrangement 36 for generating from the detected signals, control potentials for the deflection systems 37, 38 of tube 35 rotating in synchronism with the effective rotation of the Adcock antenna and at the same time varying in strength with corresponding variations in the detected signal. This type of indicating device has been shown in more elaborate detail in my co-pending application Serial No. 432,423 filed February 26, 1942. Since switches 22, 23, 23' are thus operative to produce cophasal effective rotation of deflection fields within tubes 18 and 35, it is clear that when the switches 22, 23, 23' are thrown into "sensing" positions, motor 34 will respond to the 90° shift in phase virtually as fast as the switching of detected signals into coils 17' and true "sensing" indications are thus relayed to the remote point. The apparatus thus far described in connection with Fig. 1, particularly the transmission lines 27, 28 provides the advantage that both the detected signals and the synchronization signals may be independently adjusted for optimum transmission and phase relation so as to produce at the remote end as faithful a reproduction of direction indications as obtained at the antenna end. Faithful reproduction is further assured by the fact that each line 27, 28 carries all the frequencies necessary to define both the synchronizing and detected signals with utmost fidelity.

In cases where transmission lines are at a premium, direction indications may be transmitted to a remote point over but a single transmission line in the manner shown in Fig. 2. The circuit of Fig. 2 shows merely the transmission line means and another type of indicating apparatus which may be installed at remote indicating stations. In accordance with this embodiment, the transmission line means comprises at the antenna end thereof, two branches, one 39 of which is connected to terminals 25 of receiver-detector 16 and the other 40 of which is connected to the synchronization signal terminals 26. As before in the case of Fig. 1, both branches 39 and 40 include appropriate level control means 41, 42.

Branch 40 further includes a source of carrier energy which in a network 43 is modulated in accordance with the synchronizing signal. If the transmission line employed be an ordinary telephone circuit, it is preferred that the carrier which is modulated in network 43 be of the order of 5000 cycles, so as not to encounter the attenuation difficulties present at higher frequencies in this type circuit. As above explained, the preferred output of receiver-detector 16 comprises a series of cusps. It is clear that in order to transmit these cusps faithfully along the transmission line, the latter must pass several harmonics of the recurrent frequency of the cusps in addition to the latter frequency. It has been found that a band of frequencies extending to 4500 cycles is adequate to define the cusps for direction indicating purposes.

Both branches 39 and 40 are connected to a single transmission line 44. In order to prevent an interchange of energy between these branches, suitable decoupling means 45, 46 is provided in each instance. If the last stage of level control 41 and of network 43 each include an electron discharge device, such device will be sufficient for decoupling purposes and additional means 45, 46 will be unnecessary.

At the receiving end, the detected and synchronization signals are separated into two channels 47, 48 corresponding to branches 39 and 40, respectively. Synchronization signals are obtained in channel 48 by filter means 49 passing a band of frequencies including the carrier introduced in network 43 plus and minus at least the frequency of the synchronization signal. Output from filter 49 is then amplified, demodulated and shifted in phase by well-known types of devices 50, 51, 52 to yield the synchronization signal in the same phase relationship as supplied to motor 19 and of sufficient magnitude to operate the means for rotating the deflection field within the remote indicating apparatus. In the form shown, this remote indicating apparatus is of the type shown at the antenna end in the circuit of Fig. 1 and comprises a synchronous motor 53 rotating a pair of deflection coils 54 about the neck of the cathode ray indicating tube 55.

As above explained, the detected signal is satisfactorily reproduced by frequencies up to 4500 cycles in the above-mentioned case. Accordingly, channel 47 first includes filtering means 56 passing this range of frequencies. As in the case of channel 48, amplifier means 57 are provided as well as phase control means 58 which appropriately correlate the phase of synchronization signals and detected signals so that direction indications obtained at the remote end on the screen of tube 55 correspond precisely with those at the antenna end on the screen of tube 18, as will be clear.

Since it is more difficult to transmit the lower (and most important) of the frequencies needed to characterize the cusps of detector output, a further modification shown in Fig. 3 provides means for assuring a more faithful transmission of these lower frequencies. The embodiment shown in Fig. 3 is essentially the same as that above described in connection with Fig. 2 as far as the transmission line means is concerned. However, branch 39 at the antenna end of the transmission line 44 includes additionally a network 59 for inverting the zero-to-4500 cycle spectrum necessary to define the cusp signals with tolerable accuracy. At the remote end, in order to restore the detected cusp envelope, frequencies are again inverted by a similar network 60 after passing filter 56 and channel 47. For purposes of further illustrating the flexibility of direction-finder-indication transmission means in accordance with the invention, the transmission line means 44 of Fig. 3 is shown connected at the remote end to still another type of direction indicating system. This latter system is again built around a cathode ray device 61. Tube 61, however, includes a pair of mutually perpendicular deflection systems 62, 63 and a conical electrode deflection system 64. The structure of and connections for the latter deflection system are of the type described in my co-pending application, Serial No. 394,645 filed May 22, 1941. Deflection systems 62, 63 are fixed with respect to indicator tube 61 and supplied directly with the synchronizing signals furnished by channel 48 in phase quadrature relation. Thus, deflection system 62 is directly connected to channel 48 and deflection system 63 is connected thereto through a phase shifting device 65 for producing the quadrature phase relation.

In cases where extreme accuracy in the definition of cusps in the output of detector 16 is required and also where transmission lines are at a premium, indication signals may be transmitted to a remote point in accordance with the embodiment shown in Fig. 4. According to this embodiment, completely separate transmission channel 66 is provided for the detected signals and as before, this channel is connected to terminals 25 of detector 16. Channel 66 is shown to include, at the antenna end, means 67 for appropriately adjusting the level of detected signals for most appropriate transmission along line 66 and, at the remote end, amplifier and phase control means 68, 69 for above-indicated reasons. If desired, frequency spectrum inverter means may be additionally included at both ends of line 66 in the manner and for the purposes described in connection with Fig. 3. It is usual, in actual operation of remote indication circuits in accordance with the invention, additionally to require a further transmission line so as to have voice or other telecommunication between the antenna station and the remote apparatus.

In accordance with the embodiment of Fig. 4, this additional intelligence, which may be very satisfactorily transmitted at frequencies below 4500 cycles, is connected to the same line 70 employed to carry the synchronization signals. At the antenna end of line 70, the latter thus comprises two branches 71, 72. Branch 71 carries the synchronization signals and is therefore directly connected to terminals 26. It preferably includes elements 73, 74, 75 for adjusting the level of synchronization signals, for modulating a 5000 cycle carrier, and for decoupling, as in the cases of the circuits of Figs. 2 and 3. Branch 72 also includes level control means 76 and decoupling means 77, but in order to insure that frequencies in the neighborhood of the carrier will not affect the synchronization signals, it also includes a low-pass filter 78 passing sufficient frequencies for the telephone or other intelligence passed therealong. At the remote end of transmission line 70, the synchronization signals are segregated into a first branch 79 by means of a filter 80 similar to filters 49 in Figs. 2 and 3. Another low-pass filter 81 passing the intelligence frequencies (zero to 4500 cycles) conducts the intelligence in a second branch 82. As in the above described other embodiments, branch 79 for the synchronization signals includes appropriate amplifier, demodulation and phase control means 83, 84, 85, and branch 82 includes suitable amplitude and phase control means 86, 87.

It is apparent that I have described a number of direction finder systems having the utmost flexibility. These systems are therefore particularly useful where speed of installation is of the essence, and where direction finder indications obtained at one station must be accurately known with no noticeable delay at another point which may be very remote from the central receiving apparatus. The teachings of the invention make possible the conservation of available transmission lines; and, in spite of the fact that ordinary telephone lines are often used, highly accurate direction indications may be read at the remote ends of any one of the systems described.

Although in the above description and embodiments the device 19 has been considered as a synchronous motor, it is to be understood as merely a schematic illustration of one solution. In an alternative arrangement, this device 19 is a motor-generator unit—in which case the source 20 is not required. In this latter embodiment all circuit connections are as shown in Fig. 1 with the exception of source 20, which, as indicated, is omitted.

While I have described my invention particularly in connection with the preferred forms shown, it is to be understood that many modifications, additions and omissions may be made within the scope thereof as defined by the appended claims.

What is claimed is:

1. A direction finder system comprising directive antenna means, means for effectively rotating the directivity thereof, means for producing a synchronizing signal for controlling the rotating means, receiver and detector means coupled to said antenna means, cathode ray indicating means including means for producing an effectively rotating field therein in synchronism with the effective rotation of said antenna means in response to a receipt of said synchronizing signal, and deflection means responsive to signals from said receiver and detector means for setting up field variations within said cathode ray indicator means corresponding to variations of the output of said receiver and detector means for various angular positions of said effective rotation, and transmission line means connected at one end to said means producing a synchronizing signal and at the other end to said means producing an effectively rotating field, said transmission line means coupling the output from said receiver and detector means to said means responsive thereto, said transmission line means including toward the end thereof adjacent said antenna means, a first circuit coupled to the synchronizing means and a second circuit connected to the output from said receiver and detector means, said first circuit including means producing a carrier of higher frequency than the highest of the essential components of said output modulated in synchronism with said effective rotation; said transmission line means further including toward the end thereof adjacent said indicating means a first circuit connected to said means responsive to signals from said receiver and detector means; and a second circuit including filter means passing frequencies in the neighborhood of said carrier and demodulating means, the last-mentioned second circuit being connected to said means for producing an effectively rotating field.

2. A direction finder system comprising directive antenna means, means for effectively rotating the directivity thereof, means for producing a synchronizing signal for controlling the rotating means, receiver and detector means coupled to said antenna means, cathode ray indicating means including means for setting up an effectively rotating field therein in synchronism with the effective rotation of said antenna means in response to a receipt of said synchronizing signal, and deflection means responsive to signals from said receiver and detector means for setting up field variations within said cathode ray indicator means corresponding to variations in the output of said receiver and detector means for various angular positions of said effective rotation, and transmission line means connected at one end to said means producing a synchronizing signal and at the other end to said means producing an effectively rotating field, said transmission line means also coupling the output from said receiver and detector means to said means responsive thereto; said transmission line means including toward the end thereof adjacent said antenna means a first circuit coupled to the synchronizing means and a second circuit connected to the output from said receiver and detector means, said first circuit including means producing a carrier of higher frequency than the highest of the essential components of said output modulated synchronously with said effective rotation; said transmission line mean further including toward the end thereof adjacent said indicating means a first circuit including filter means passing substantially all frequencies below said carrier, and amplifier means, the last mentioned circuit being connected to said means responsive to signals from said receiver and detector means; and a second circuit including amplifier and phase control means, said last-mentioned second circuit being connected to said means for setting up an effectively rotating field, whereby said effectively rotatable means may be operative in synchronism with effective rotation of said antenna means.

3. A direction finder system comprising at an antenna station, directive antenna means, effectively rotating means for effectively rotating directivity thereof, means for producing a synchronizing signal for controlling said rotating means, and receiver and detector means coupled to said antenna means, and at an indicating station, cathode ray indicating means including means for setting up an effectively rotating field therein in synchronism with said effective rotation of said antenna means, and deflection means responsive to signals from said receiver and detector means for setting up field variations within said cathode ray indicator means corresponding to variations in signals detected by said receiver and detector means for various angular positions of said effective rotation, said indicating station and said antenna station each including a telecommunication translating means, a first transmission line coupling said receiver and detector means to said deflection means, and a second transmission line interconnecting both said translating means and also connected at one end to said means for producing a synchronizing signal and at the other end to said means for producing an effectively rotating field; said other transmission line including toward the end thereof adjacent said antenna station a first branch coupled to said means for producing a synchronizing signal, and a second branch connected to the translating means at said antenna station, said first branch including means producing a carrier of higher frequency than the highest of the essential components of energy transmitted by said translating means, said carrier being modulated synchronously with said effective rotation; said other transmission line further including toward the end thereof adjacent said indicating station a first branch including filter means passing said essential components and connected to the telecommunication transmitting means at the indicating station, and a second branch including filter means passing frequencies in the neighborhood of said carrier, and demodulating means, said last-mentioned second branch being connected to said means for setting up an effectively rotating field.

4. A direction finder system comprising antenna means, means for effectively rotating directivity thereof, means for producing a synchronizing signal in synchronism with the effective rotation, receiver and detector means coupled to said antenna means, cathode ray indicating means including means for setting up an effectively rotating field therein in synchronism with the effective rotation of said antenna means in response to a receipt of said synchronizing signal, and deflection means responsive to signals from said receiver and detector means for setting up field variations within said cathode ray indicator means corresponding to variations in the output of said receiver and detector means for various angular positions of said effective rotation, and transmission line means coupled at one end to said means producing a synchronizing signal and at the other end to said means producing an effectively rotating field, said transmission line means also connecting said output to said means responsive thereto; said transmission line means including toward the end adjacent said antenna means a first circuit coupled to the synchronizing means and a second circuit coupled to said output, said first circuit including means producing a carrier of higher frequency than the highest essential components of said output modulated in synchronism with said effective rotation, said second circuit including frequency spectrum inverter means inverting said essential components; said transmission line means including toward the end adjacent said cathode ray indicator means a first circuit connected to said means responsive to said receiver and detector means and including filter means passing frequencies present in the output of said inverter means and further frequency spectrum inverter means, and a second circuit connected to said means for setting up an effectively rotating field and including filter means passing frequencies in the neighborhood of said carrier and demodulator means.

5. A direction finder system comprising directive antenna means, means for effectively rotating directivity thereof, means for producing a synchronizing signal for controlling the rotating means, receiver and detector means coupled to said antenna means, indicating means including means for producing an effective rotation in synchronism with the effective rotation of said antenna means in response to receipt of said synchronizing signal, means responsive to signals from said receiver and detector means for indicating variations in signals detected by said receiver and detector means for various angular positions of said effective rotation of said antenna, transmission line means connected at one end to said means producing a synchronizing signal and at the other end to said means for producing an effective rotation in synchronism with the effective rotation of said antenna means and including means passing frequencies characterized only in accordance with said effective rotation, further transmission line means coupling the output from said receiver and detector means to said means responsive thereto and including means passing frequencies characterizing only said output from said receiver and detector means, and a single transmission line common to each said transmission line means.

6. A direction finder system comprising directive antenna means, effectively rotating means for effectively rotating the directivity thereof, means for producing a synchronizing signal for controlling said rotating means, receiver and detector means coupled to said antenna means, cathode ray indicating means including means for producing an effectively rotating field therein in synchronism with said effective rotation of said antenna means in response to a receipt of said synchronizing signal, and deflection means responsive to signals from said receiver and detector means for setting up field variations within said cathode ray indicator means corresponding to variations of the output of said receiver and detector means for various angular positions of said effective rotation, and transmission line means connected at one end to said means producing a synchronizing signal and at the other end to said means producing an effectively rotating field, said transmission line means coupling output from said receiver and detector means to said means responsive thereto, said transmission line means including toward the end thereof adjacent said antenna means a first circuit coupled to said synchronizing means and a second circuit connected to the output from said receiver and detector means, said first circuit including means producing a carrier of higher frequency than the highest of the essential components of said output modulated in synchronism with said effective rotation; said transmission line means further including toward the end thereof adjacent said indicating means, a first circuit connected to said means responsive to signals from said receiver and detector means; and a second circuit including filter means passing frequencies in the neighborhood of said carrier and demodulating means, said second circuit being connected to said means for setting up an effectively rotating field.

HENRI G. BUSIGNIES.

REFERENCES CITED

The following references are of record in the file of this patent:

UNITED STATES PATENTS

| Number | Name | Date |
|---|---|---|
| 2,151,917 | Hyland | Mar. 28, 1939 |
| 2,233,275 | Wolff | Feb. 25, 1941 |